(12) United States Patent
Meyer

(10) Patent No.: US 9,656,432 B2
(45) Date of Patent: May 23, 2017

(54) SEALANT DELIVERY SYSTEM

(71) Applicant: Andrew Meyer, Lake Mills, WI (US)

(72) Inventor: Andrew Meyer, Lake Mills, WI (US)

(73) Assignee: Trek Bicycle Corporation, Waterloo, WI (US)

( * ) Notice: Subject to any disclaimer, the term of this patent is extended or adjusted under 35 U.S.C. 154(b) by 447 days.

(21) Appl. No.: 13/658,555

(22) Filed: Oct. 23, 2012

(65) Prior Publication Data

US 2014/0113072 A1    Apr. 24, 2014

(51) Int. Cl.
*B29C 73/16* (2006.01)
*B60C 29/06* (2006.01)
*B29L 30/00* (2006.01)

(52) U.S. Cl.
CPC .......... *B29C 73/166* (2013.01); *B60C 29/062* (2013.04); *B29L 2030/00* (2013.01)

(58) Field of Classification Search
CPC ...... B29C 73/16; B29C 73/163; B29C 73/166
USPC ..... 141/10, 38, 114; 152/502–507; 220/666, 220/667; 156/115
See application file for complete search history.

(56) References Cited

U.S. PATENT DOCUMENTS

| | | | |
|---|---|---|---|
| 1,521,612 A | 1/1925 | Freedman | |
| 3,444,918 A | 5/1969 | Goggins | |
| 3,494,403 A * | 2/1970 | Huber | B60C 29/007 137/635 |
| 3,850,217 A * | 11/1974 | Edwards et al. | 152/503 |
| 3,942,573 A * | 3/1976 | Lawrence et al. | 152/503 |
| 3,990,492 A * | 11/1976 | Hyndman et al. | 152/158 |
| 4,054,168 A * | 10/1977 | Beers et al. | 152/520 |
| 4,202,392 A * | 5/1980 | Mineur et al. | 152/521 |
| 4,258,771 A * | 3/1981 | Snyder | 152/521 |
| 4,263,953 A * | 4/1981 | Miceli | 152/158 |
| 4,586,910 A * | 5/1986 | Buchanan | A63H 27/10 137/223 |
| 4,622,085 A * | 11/1986 | Yamada et al. | 156/94 |
| 4,884,609 A * | 12/1989 | Ho | B60C 5/24 152/337.1 |
| 4,917,646 A * | 4/1990 | Kieves | A63H 27/10 137/846 |
| 5,067,301 A * | 11/1991 | Shore | A63H 27/10 53/138.8 |
| 5,121,595 A * | 6/1992 | Shore | A63H 27/10 141/173 |
| 5,472,031 A | 12/1995 | Austin | |
| 6,506,273 B1 | 1/2003 | Hull | |
| 6,672,352 B2 * | 1/2004 | Yamagiwa et al. | 152/506 |
| 6,932,125 B2 * | 8/2005 | Stanley | A63H 27/10 141/114 |
| 7,047,841 B2 | 5/2006 | Ragan | |
| 7,159,490 B2 | 1/2007 | Ragan | |
| 7,316,252 B1 * | 1/2008 | Heard | B60C 5/22 152/196 |
| 8,685,513 B1 * | 4/2014 | Dry | 428/35.8 |
| 2008/0264536 A1 * | 10/2008 | Yamagiwa | 152/152 |

FOREIGN PATENT DOCUMENTS

| | | |
|---|---|---|
| DE | 19839911 | 3/2000 |
| JP | 2001225853 | 8/2001 |
| JP | 2001240153 | 9/2001 |

* cited by examiner

*Primary Examiner* — Timothy L Maust

(57) ABSTRACT

An apparatus including a pouch and a valve stem. The pouch can include a sealant. The valve stem can be fluidly coupled to the pouch.

19 Claims, 5 Drawing Sheets

SEALANT DELIVERY SYSTEM

BACKGROUND

The present invention relates generally to the field of sealants and more particularly to the field of sealant delivery systems.

Liquid tire sealant can be added to tires to prevent deflation in case of small punctures. The liquid tire sealant can be added to tires before or after a tire puncture. For example, tubeless tires can be pretreated with tire sealant to immediately seal a puncture during use.

However, adding liquid tire sealant to a mounted tire can be messy and complicated. The mounted tire can include a wheel with a valve stem and a tire mounted to the wheel. In order to treat the mounted tire with liquid tire sealant, a user removes a valve of the valve stem and injects liquid tire sealant through the valve stem. The user then replaces the valve and inflates the tire. The liquid tire sealant often fouls the valve stem making it difficult to reinstall the valve. In addition, determining the proper amount of liquid tire sealant to use can be difficult. Therefore, new and improved systems and methods for delivering tire sealant are needed.

SUMMARY

One illustrative embodiment is related an apparatus including a pouch and a valve stem. The pouch can include a sealant. The valve stem can be fluidly coupled to the pouch.

Another illustrative embodiment is related an apparatus including a pouch and a valve stem. The pouch can be configured to breach at a predetermined pressure. The valve stem can be fluidly coupled to the pouch.

Another illustrative embodiment is related a method. The method can include securing a sealant delivery device to a rim. The sealant delivery device can include a valve stem fluidly coupled to a pouch at least partially filled with a volume of a tire sealant. The pouch can be configured to breach at a predetermined pressure. A tire can be mounted to the rim. The pouch can be inflated to at least the predetermined pressure using the valve stem. The pouch can breach and releases the tire sealant into the tire.

BRIEF DESCRIPTION OF THE DRAWINGS

The foregoing and other features of the present disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings. In the drawings, like reference numbers indicate identical or functionally similar elements. The drawings are not to scale.

DETAILED DESCRIPTION OF THE ILLUSTRATIVE EMBODIMENTS

Figure 1:
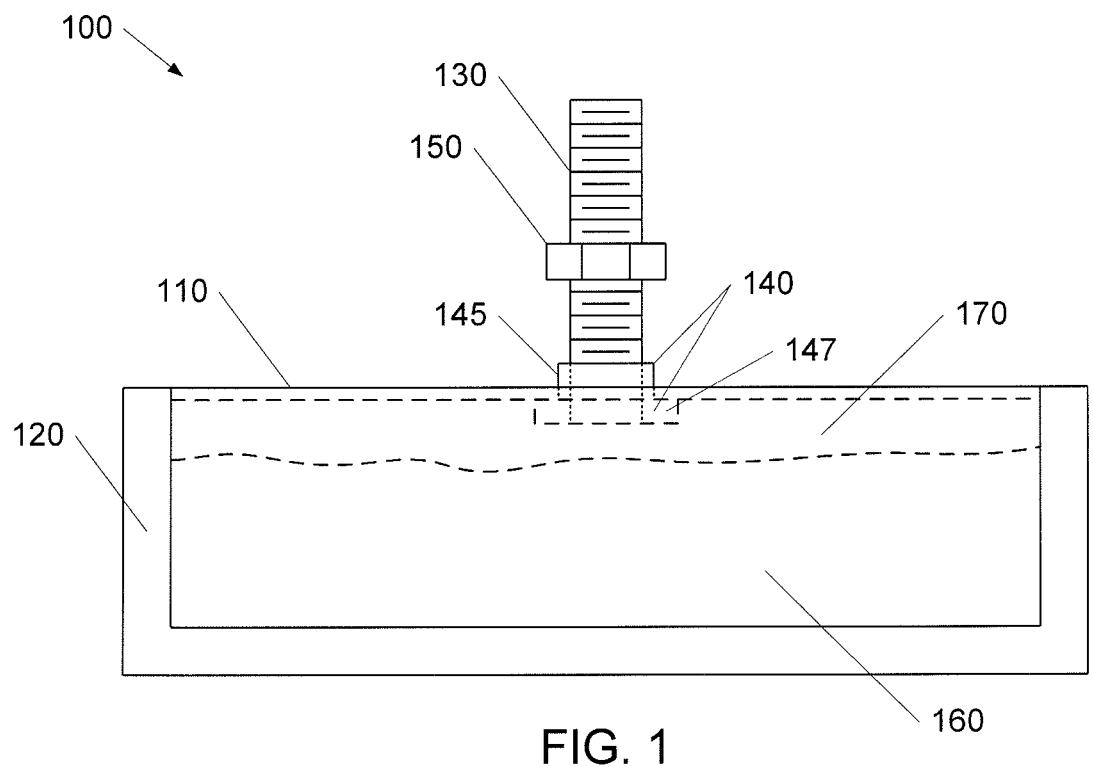
FIG. 1 is a front view of a sealant delivery system in accordance with an illustrative embodiment.

In the following detailed description, reference is made to the accompanying drawings, which four a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and make part of this disclosure.

The present disclosure is directed to a sealant delivery system and method. The sealant delivery system can be a pouch of sealant with a valve stem. A bore of the valve stem can be fluidly connected with the inside of the pouch. The sealant can be a predetermined amount of tire sealant such as a glycol-based sealant.

The valve stem can be inserted through a valve stem hole of a rim and secured to the rim. A tire can be mounted to the rim so that the pouch of sealant is located between the rim and the tire. A user can inflate the tire via the valve stem. During inflation, the pouch of sealant can burst, deploying the sealant to the inside of the tire. Advantageously, the user does not have to measure out an amount of sealant. Advantageously, the sealant is initially contained within the pouch thereby avoiding spillage.

Figure 2:
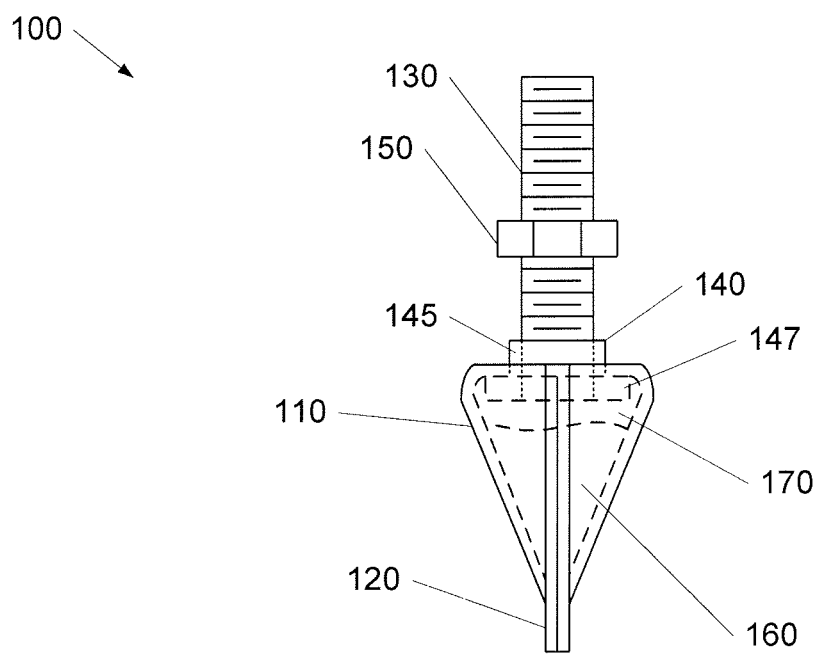
FIG. 2 is a side view of the sealant delivery system of FIG. 1 in accordance with an illustrative embodiment.
Figure 3:
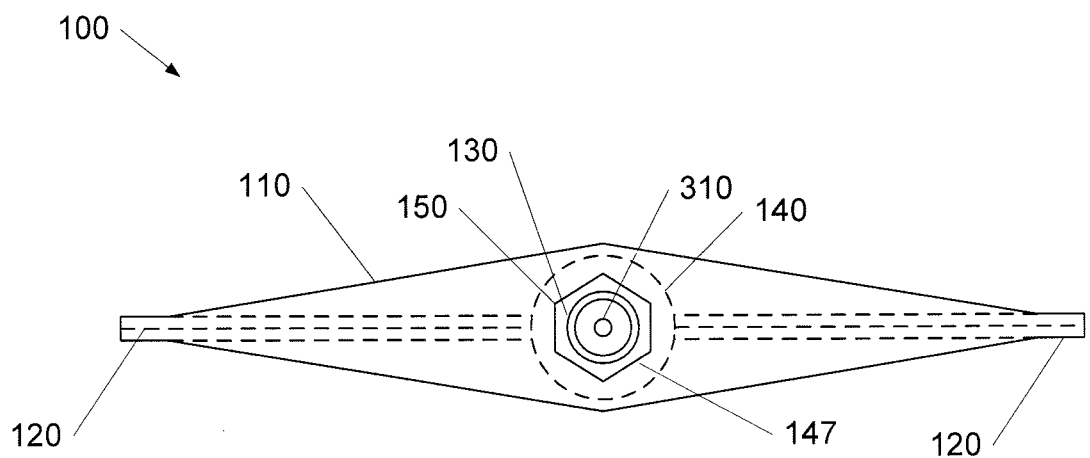
FIG. 3 is a top view of the sealant delivery system of FIG. 1 in accordance with an illustrative embodiment.
Figure 4:
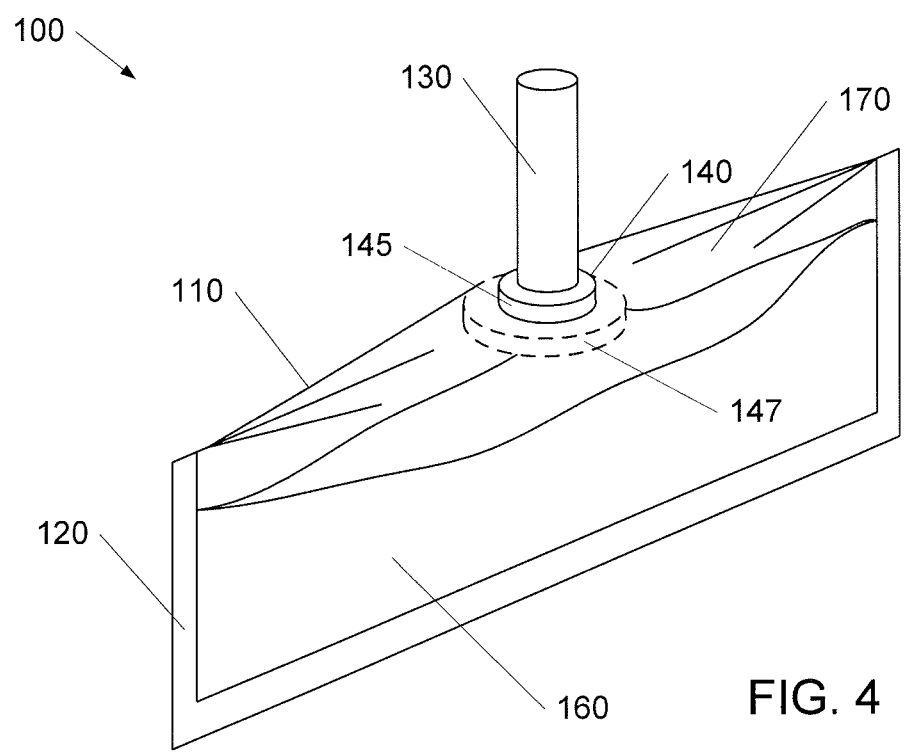
FIG. 4 is a perspective view of the sealant delivery system of FIG. 1 in accordance with an illustrative embodiment.

Referring to FIG. 1, a front view of a sealant delivery system 100 in accordance with an illustrative embodiment is shown. Referring to FIG. 2, a side view of the sealant delivery system of FIG. 1 in accordance with an illustrative embodiment is shown. Referring to FIG. 3, a top view of the sealant delivery system of FIG. 1 in accordance with an illustrative embodiment is shown. Referring to FIG. 4, a perspective view of the sealant delivery system of FIG. 1 in accordance with an illustrative embodiment is shown. The sealant delivery system 100 can include a pouch 110, a valve stem 130, a valve stem support 140, and a nut 150. (FIG. 4 does not show nut 150) The valve stem 130 can be attached to the pouch 110 by the valve stem support 140. The pouch 110 can contain a fluid 160.

The pouch 110 can be any container that can hold a liquid or powder. The pouch 110 can be made of plastic, foil, wax paper or any other material capable of containing a liquid or powder. For example, the plastic can be a thermoplastic or thermoset plastic such as polyethylene, polypropylene, polystyrene, polyvinyl chloride, polytetrafluoroethylene, or nylon. In one embodiment, the pouch 110 can be made of a material that degrades or breaks up after the pouch 110 is burst. The pouch 110 can be formed, pressed, stamped, injection molded, and/or blow molded to shape. The pouch 110 can include multiple chambers.

In one embodiment, the pouch 110 can be a sheet of plastic that is fused to itself to create a pouch. For example, the pouch 110 can include bonding areas 120. In one embodiment, the bonding areas 120 can be fused with heat. In other embodiments, the bonding areas 120 can be glued or ultrasonically welded. The bonding areas 120 can have a predetermined breaching strength. For example, the bonding areas 120 can have a breaching strength of about 20 psi, however, any breaching strength is possible. The bonding areas 120 can be designed to breach in a range from about 5 psi to about 60 psi; however, any breaching pressure is possible. Alternatively, the bonding areas 120 can be stronger than the other areas of the pouch 110. Alternatively, the pouch 110 itself can breach before the bonding areas 120.

The pouch 110 can be filled with a sealant 160. In one embodiment, the pouch 110 can be filled with a predetermined amount of the sealant 160. The sealant 160 can be a fluid, powder, gel, or combination thereof. For example, the sealant 160 can be a latex-based or glycol-based tire sealant. The sealant 160 can include particles, fibers, microcapsules, and/or microspheres. In one embodiment, the predetermined amount of the sealant 160 can be in a range of 1-3 fluid ounces. In another embodiment, the predetermined amount of the sealant 160 can be in a range of 2-4 fluid ounces.

The pouch 110 can be filled to include an air space 170. The air space 170 can enhance the bursting of the pouch 110 by creating a space for the inflation gas to collect and build pressure.

The pouch 110 can be any shape. In some embodiments, the pouch 110 can be a rectangular pouch or cylinder. The pouch 110 can be sized and shaped to fit a particular application, however, any size is possible. For example, a pouch for a road bike can be about 0.75" in diameter and 6" long containing about 1.5 fluid ounces of fluid. A pouch for a road bike can contain about 1 to 3 fluid ounces of fluid, however, any amount of fluid is possible. In another example, a pouch for a mountain bike can be about 1.125" in diameter and 6" long containing about 3 fluid ounces of fluid. A pouch for a mountain bike can contain about 2 to 4 fluid ounces of fluid, however, any amount of fluid is possible. The pouch 110 can be sized for any tire or device where sealant is used, include, but not limited to, automotive tires, light truck tires, semi tires, heavy equipment tires, industrial tires, aviation tires, storage tanks, and pressure vessels.

The valve stem 130 can include a valve 310. The valve stem 130 and valve 310 can be a Schrader-type valve, a Presta-type valve, a tire pressure monitoring system (TPMS) valve, or any other valve system. The valve 310 can be removable or non-removable. An outer surface of the valve stem 130 or a portion of an outer surface of the valve stem 130 can be threaded. In one embodiment, the valve stem 130 can be secured to a rim using the nut 150. Alternatively, the valve stem 130 can be a press-in-type valve stem. The valve stem 130 can be made of brass, steel, aluminum, rubber, plastic or any other material.

The valve stem 130 can be attached to the pouch 110 by the valve stem support 140. The valve stem support 140 can be made of plastic or metal or any other material. For example, the plastic can be a thermoplastic or thermoset plastic such as polyethylene, polypropylene, polystyrene, polyvinyl chloride, polytetrafluoroethylene, or nylon. The valve stem support 140 can be configured to seal the pouch 110 to the valve stem 130 and to seal the valve stem 130 to a rim. For example, the valve stem support 140 can include a sleeve 145 and a flange 147. The sleeve 145 can fit between the valve stem 130 and the rim. When the valve stem 130 is tightened against the rim using the nut 150, the sleeve 145 can compress thereby sealing the valve stem 130 and the rim. When the valve stem 130 is tightened against the rim using the nut 150, the flange 147 can press against the rim thereby sealing the valve stem 130 and the rim.

During manufacture, the pouch 110 can be formed, for example, by bonding the bonding areas 120. The sealant 160 can be injected through the valve stem 130. Finally, the valve 310 can be inserted into the valve stem 130. Alternatively, the pouch 110 by bonding the bonding areas 120 except for a filling port. The sealant 160 can be injected through the filling port and bonding of the bonding areas 120 can be completed. Alternatively, the pouch 110 can include a bung and plug for filing.

When a user inflates the pouch 110 to 30 psi, using valve stem 130, the bonding areas 120 can breach since the bonding areas 120 has a breaching strength of about 20 psi. Thus, the predetermined amount of the sealant 160 can be released or expelled from the pouch 110, for example, into a tire.

Optionally, the valve stem support 140 can include a barrier (not shown). The barrier can be configured to prevent the sealant 160 from entering the valve stem 130 before initial inflation. In one embodiment, the barrier can be an integral membrane or part of the pouch 110 that is easily burst at an inflation air pressure thereby fluidly connecting the valve stem 130 to the inside of the pouch 110. Alternatively, the barrier can be a plug.

In some embodiments, O-rings, washers, and sealants can be used between the valve stem 130 and the rim and between the nut 150 and the rim. The pouch 110 can be bonded to the valve stem support 140. For example, the pouch 110 can be bonded to flange 147 of the valve stem support 140. In one embodiment, the pouch 110 can be glued to flange 147 with adhesive. In another embodiment, the pouch 110 can be fused to flange 147 with heat or ultrasonic welding. In other embodiments, the pouch 110 can be mechanically attached to the valve stem 130.

In one embodiment, the pouch 110, valve stem support 140, and valve stem 130 can be an integral unit. For example, the pouch 110, valve stem support 140, and valve stem 130 can be molded simultaneously as a monolithic piece. In another embodiment, the pouch 110 and valve stem support 140 can be co-molded with the valve stem 130.

In one embodiment, a user can fill the pouch 110 with a predetermined amount of the sealant 160 before securing the sealant delivery system 100 to a rim. The pouch 110 can include means for filling such as a plug, a plastic zipper-type opening (i.e., Ziploc™), or an adhesive flap. Alternatively, a user can remove the valve of valve stem 130 and fill the pouch 110 with an amount of sealant 160 through the valve stem 130. Advantageously, the user can choose the amount of sealant 160 used.

Advantageously, because the sealant delivery system 100 can include a predetermined amount of sealant 160, a user does not have to measure out an amount of sealant. Advantageously, the sealant 160 is initially contained within the pouch 110 hereby avoiding spillage.

Figure 5:
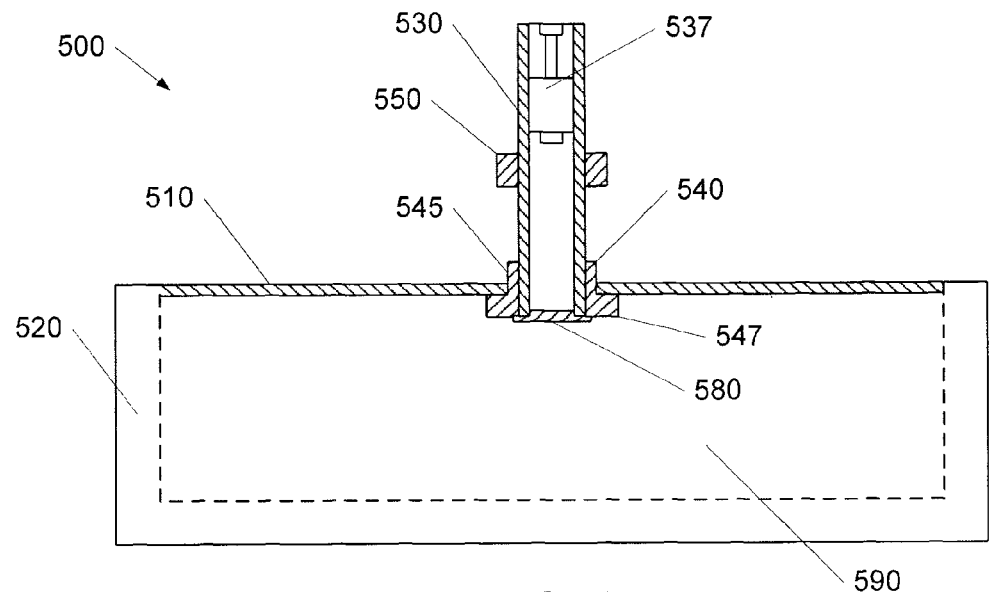
FIG. 5 is a section view of a sealant delivery system in accordance with an illustrative embodiment.

Referring to FIG. 5, a section view of a sealant delivery system 500 in accordance with an illustrative embodiment is shown. The sealant delivery system 500 can include a pouch 510, a valve stem 530, a valve stem support 540, and a nut 550. The valve stem 530 can be attached to the pouch 510 by the valve stem support 540. The valve stem support 540 can include a sleeve 545 and a flange 547. In one embodiment, the pouch 510 can include a bonding area 520 that can be used to create a sealant holding volume 590.

The valve stem 530 can include a bore 535 and a valve 537. The valve 537 can be a Schrader-type valve, a Presta-type valve, or any other valve system. The valve 537 can be removable or non-removable. In one embodiment, the bore 535 and the valve 537 can be threaded.

In one embodiment, the valve stem support 540 can include a barrier 580. The barrier can be configured to prevent sealant from entering the valve stem 530 before initial inflation. In one embodiment, the barrier 580 can be molded as part of the valve stem support 540. In another embodiment, the barrier 580 can be an integral membrane or part of the pouch 110 that is easily burst at an inflation air pressure thereby fluidly connecting the valve stem 130 to the inside of the pouch 110. Alternatively, the barrier 580 can be a plug. Alternatively, the valve can include an integral barrier.

Figure 6:
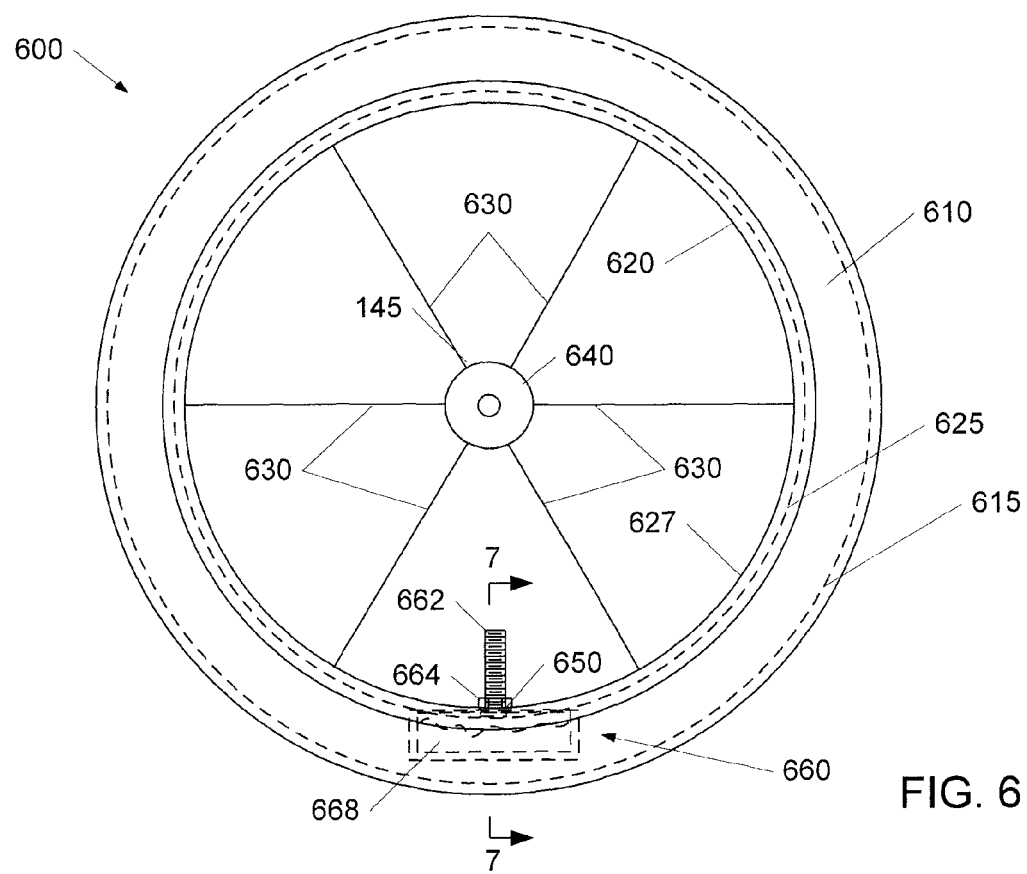
FIG. 6 is a front view of a mounted sealant delivery system in accordance with an illustrative embodiment.

Referring to FIG. 6, a front view of a mounted sealant delivery system 600 in accordance with an illustrative embodiment is shown. The mounted sealant delivery system 600 can include a tire 610 mounted on a rim 620. The rim 620 can be connected to a hub 640 by spokes 630. The rim 620 can include a valve hole 650.

A sealant delivery system 660, as described above, can be mounted to the rim 620 using a valve hole 650. The sealant delivery system 660 can include a pouch 668, a valve stem 662, and a nut 664. The pouch 668 can contain sealant. The valve stem 662 can be inserted through an inside of the rim 620. The nut 664 can be threaded onto the valve stem 662 from an outside of the rim 620 to secure the sealant delivery system 660 to the rim 620. Thus, when mounted, the pouch 668 of the sealant delivery system 660 is located in a space between the rim 620 and the tire 610. The valve stem 662 can be used to inflate the tire 610.

When the tire 610 is inflated, via valve stem 662, the pouch 668 can burst, releasing its contents into the tire 610. For example, the contents of the pouch 668 can be sealant. The sealant can coat the inside of tire 620. When an object punctures the tire 620, the sealant can prevent deflation.

Figure 7:
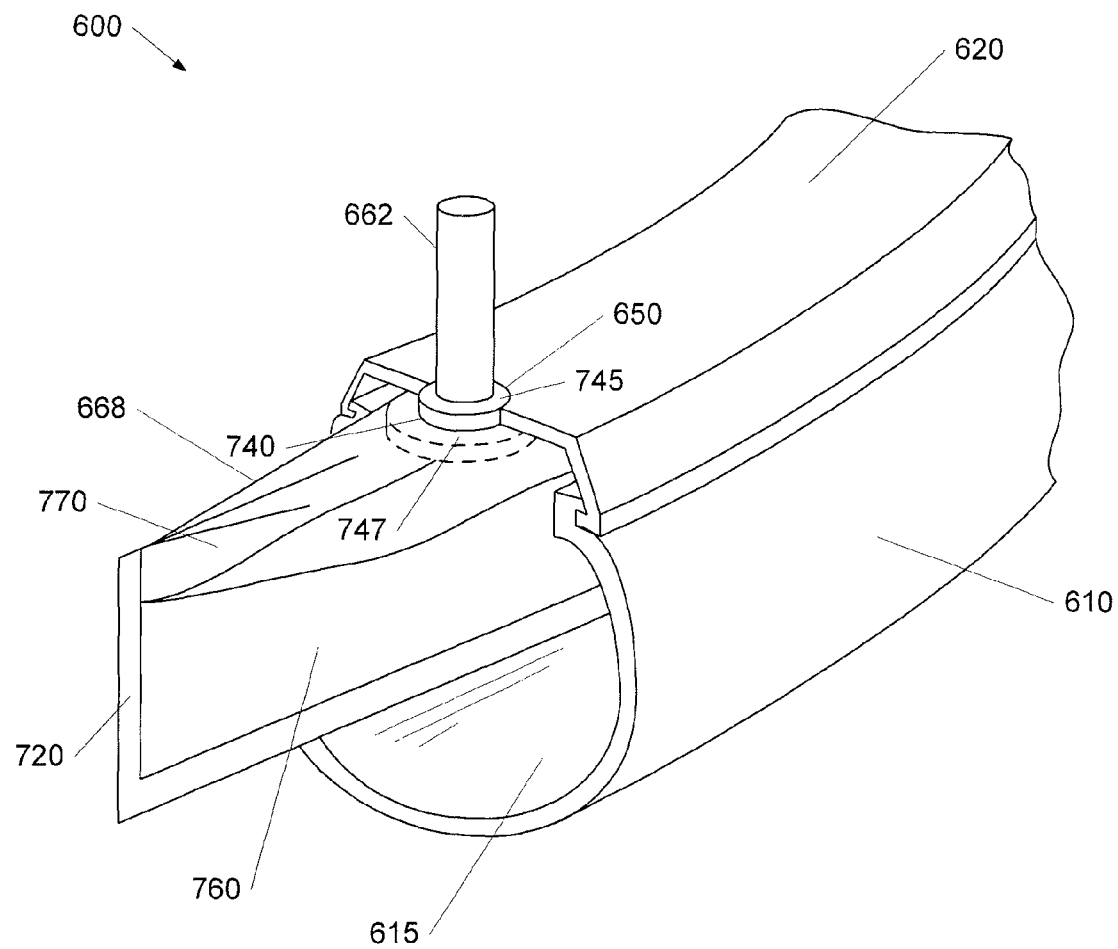
FIG. 7 is a perspective partial-section view of the mounted sealant delivery system of FIG. 6 in accordance with an illustrative embodiment.

Referring to FIG. 7, a perspective partial-section view of the mounted sealant delivery system 600 of FIG. 6 in accordance with an illustrative embodiment is shown. FIG. 7 shows the sealant delivery system 660 disposed between the rim 620 and the tire 610 (nut 664 not shown).

The pouch 668 can include a bonding area 720 to form a chamber. The pouch 668 can be filled with a sealant 760. The pouch 668 can also include an air space 770.

The pouch 668 can be connected to the valve stem 662 by a valve stem support 740. The valve stem support 740 can include a sleeve 745 and a flange 747 as described above. The sleeve 745 can be configured to insert into the valve hole 650. When the nut 664 (not shown) is tightened down on the valve stem 662, the sleeve 745 and a flange 747 can seal the valve stem 662 to the valve hole 650.

Figure 8:
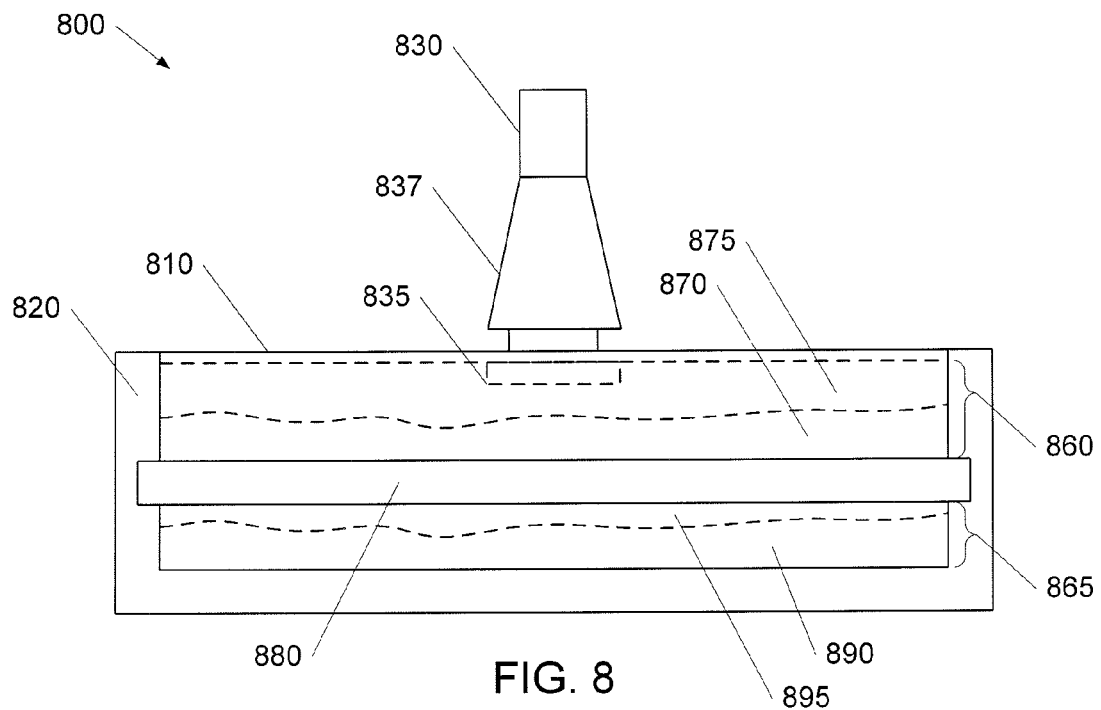
FIG. 8 is a front view of a dual chamber sealant delivery system in accordance with an illustrative embodiment.

Referring to FIG. 8, a front view of a dual chamber sealant delivery system 800 in accordance with an illustrative embodiment is shown. The dual chamber sealant delivery system 800 can include a pouch 810 and a valve stem 830. The valve stem 830 can be attached to the pouch 810 by a valve stem flange 835 of the valve stem 830.

The pouch 810 can be any container that can hold a liquid or powder. The pouch 810 can be made of plastic, foil, wax paper or any other material capable of containing a liquid or powder. For example, the plastic can be a thermoplastic or thermoset plastic such as polyethylene, polypropylene, polystyrene, polyvinyl chloride, polytetrafluoroethylene, or nylon. In one embodiment, the pouch 810 can be made of a material that degrades or breaks up after the pouch 810 is burst. The pouch 810 can be formed, pressed, stamped, injection molded, and/or blow molded to shape.

In one embodiment, the pouch 810 can be a sheet of plastic that is fused to itself to create a pouch. For example, the pouch 810 can include first bonding areas 820. In one embodiment, the first bonding areas 820 can be fused with heat. In other embodiments, the first bonding areas 820 can be glued or ultrasonically welded.

The pouch 810 can include a first chamber 860 and a second chamber 865. The valve stem 830 can be fluidly coupled to the first chamber 860. In one embodiment, the first chamber 860 and the second chamber 865 can be formed by a second bonding area 880. The second bonding area 880 can divide the pouch 810. The second bonding area 880 can have a weaker bond than the first bonding areas 820 so that the second bonding area 880 breaches before the first bonding areas 820. For example, the first bonding areas 820 can have a breaching strength of about 40 psi, however, any breaching strength is possible. The second bonding area 880 can have a breaching strength of about 20 psi, however, any breaching strength is possible. Alternatively, the pouch 810 can be molded with a first chamber 860 and a second chamber 865.

The pouch 810 can be filled with a plurality of sealants. The first chamber 860 can include a first material 870. The first material 870 can be, for example, a first sealant. The first chamber 860 can include a first airspace 875. The second chamber 865 can include a second material 890. The first material 870 can be, for example, a second sealant. The second chamber 865 can include a second airspace 895. The first material 870 can be different than the second material 890. In one embodiment, the first material 870 and the second material 890 can mixed with one another to form a sealant. In another embodiment, the first material 870 and the second material 890 can react with one another when mixed. In another embodiment, the first material 870 can be a liquid and the second material 890 can be a powder, microcapsules, or microspheres.

The valve stem 830 can include a valve. The valve stem 830 and valve can be a Schrader-type valve, a Presta-type valve, a tire pressure monitoring system (TPMS) valve, or any other valve system. The valve can be removable or non-removable. In one embodiment, the valve stem 830 can be pressed into a rim so that the rim is seated between the valve stem flange 835 and a valve stem upper flange 837. Alternatively, the valve stem 130 can be a threaded valve stem. The valve stem 830 can be made of brass, steel, aluminum, rubber, plastic or any other material.

In the illustrative embodiment described above, when a user inflates the first chamber 860 to 30 psi, the second bonding area 880 can breach since the second bonding area 880 has a breaching strength of about 20 psi. Hence, the first chamber 860 can couple to the second chamber 865, and the first material 870 and the second material 890 can mix. The user can continue to inflate the first chamber 860, and consequently the second chamber 865, to 50 psi, breaching the first bonding areas 820 since the first bonding areas 820 have a breaching strength of about 40 psi. Alternatively, the material of the pouch 810 can rupture rather than the first bonding areas 820. However, the first bonding areas 820 and the second bonding area 880 can be configured with any breaching pressure.

In other embodiments, a plurality of chambers can be formed. The plurality of chambers can be configured to breach in a sequential fashion by designing chamber dividers with predetermined breaching pressures. For example, a pouch can include three chambers in series (a first, second and third chamber) with an outer wall that has a breach strength of 40 psi, a first divider with a breach strength of 20 psi, and a second divider with a breach strength of 20 psi. The first chamber can include a valve stem as described above. A user can inflate the first chamber to 30 psi, breaching the first divider. The first and second chambers can mix. The user can continue to inflate the first chamber and second chamber to 30 psi, breaching the second divider. The first and second chambers can mix with the third chamber. The user can continue to inflate the first chamber, second chamber, and third chamber to 50 psi, breaching the outer wall.

Figure 9:
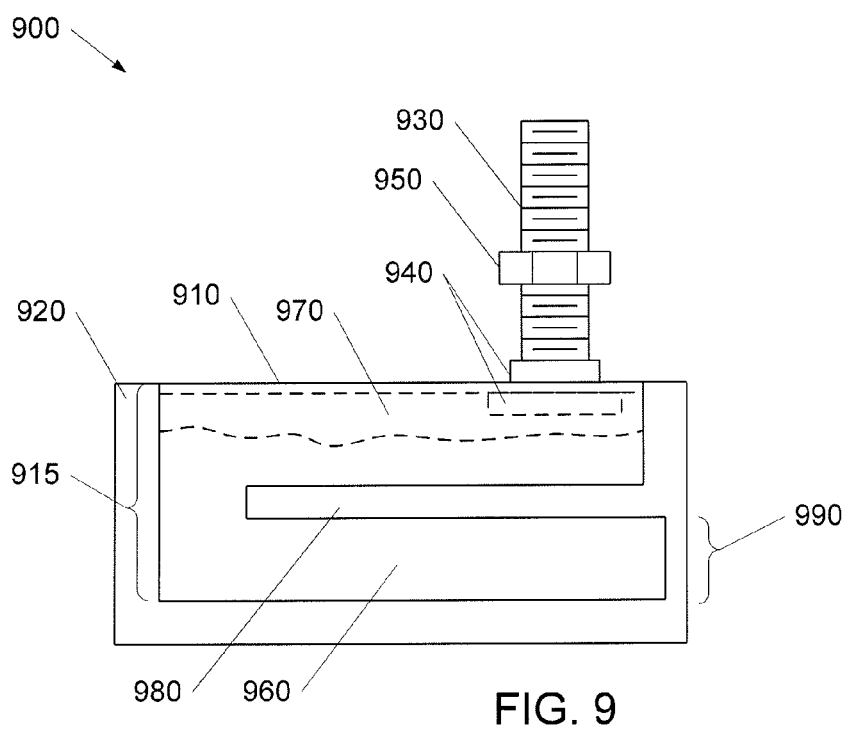
FIG. 9 is a front view of a long chamber sealant delivery system in accordance with an illustrative embodiment.

Referring to FIG. 9, a front view of a long chamber sealant delivery system 900 in accordance with an illustrative embodiment is shown. The long chamber sealant delivery system 900 can include a pouch 910, a valve stem 130, a valve stem support 940, and a nut 950. The valve stem 930 can be attached to the pouch 910 by the valve stem support 940. The pouch 910 can contain a fluid 960.

The valve stem 930 can include a valve. The valve stem 930 and valve can be a Schrader-type valve, a Presta-type valve, a tire pressure monitoring system (TPMS) valve, or any other valve system. In one embodiment, the valve stem 930 can be secured to a rim using the nut 950. The valve stem 930 can be attached to the pouch 910 by the valve stem support 940 as described above.

In one embodiment, the pouch 910 can be a sheet of plastic that is fused to itself to create a chamber 915. For example, the pouch 910 can include first bonding areas 920. In one embodiment, the first bonding areas 920 can be fused with heat. In other embodiments, the fusing areas 920 can be glued or ultrasonically welded. The first bonding areas 920 can include a second bonding area 980 that lengthens the chamber 915 of the pouch 910. The first bonding areas 920 can include a breaching area 990. The breaching area 990 can have a predetermined breaching strength that is lower than a breaching strength of the first bonding areas 920. For example, the first bonding areas 920 can have a breaching strength of about 50 psi, and the breaching area 990 can have a predetermined breaching strength of 10 psi. However, any breaching strengths are possible.

The pouch 910 can be filled with a sealant 960, as discussed above. The pouch 910 can be filled to include an air space 970. The sealant 960 can have any viscosity.

When a user inflates the chamber 915 to 20 psi, the breaching area 990 can breach since the breaching area 990 has a breaching strength of about 10 psi and the first bonding areas 920 have a breaching strength of about 50 psi. The second bonding area 980 enhances the ability of the pouch 910 to expel the sealant 960 through the breaching area 990. For example, when the sealant 960 is viscous, the pressure second bonding area 980 can prevent air from bypassing the volume of the sealant 960.

Advantageously, because the long chamber sealant delivery system 900 can include a predetermined amount of sealant 960, a user does not have to measure out an amount of sealant. Advantageously, the sealant 960 is initially contained within the long chamber sealant delivery system 900 hereby avoiding spillage.

In another embodiment, a sealant pouch can be placed in the tire before mounting. After mounting the tire, the sealant pouch can be burst by applying pressure to the outside of the tire by riding on the tire or by applying hand pressure.

One or more flow diagrams may have been used herein. The use of flow diagrams is not meant to be limiting with respect to the order of operations performed. The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

The foregoing description of illustrative embodiments has been presented for purposes of illustration and of description. It is not intended to be exhaustive or limiting with respect to the precise form disclosed, and modifications and variations are possible in light of the above teachings or may be acquired from practice of the disclosed embodiments. It is intended that the scope of the invention be defined by the claims appended hereto and their equivalents.

What is claimed is:

1. A method, comprising:
    securing a sealant delivery device to a rim, wherein the sealant delivery device includes a valve stem fluidly coupled to a pouch at least partially filled with a volume of a tire sealant and a breaching area, wherein the pouch is configured to breach at a predetermined pressure at the breaching area and cause at least a majority of the tire sealant to leave the pouch;
    mounting a tire to the rim; and
    inflating the pouch using the valve stem to at least the predetermined pressure;
    wherein the pouch breaches and releases the tire sealant into the tire.

2. The method of claim 1, wherein the volume is about 1 fluid ounce to about 4 fluid ounces.

3. The method of claim 1, wherein the pouch has a diameter of about 0.5 inches to 3 inches, the pouch has a length of about 3 inches to 9 inches, and the tire is a bicycle tire.

4. The method of claim 1, wherein the pouch comprises a sheet of material bonded to itself to form a chamber.

5. An apparatus, comprising:
    a pouch configured to breach at a predetermined pressure at a breaching area of the pouch;
    a valve stem fluidly coupled to the pouch; and
    a volume of a tire sealant disposed in the pouch;
    wherein,
        when pressurized air is applied through the valve stem and into the pouch, the pouch is configured to breach at the predetermined pressure at the breaching area;
        the valve stem is configured to be a tire valve stem; and
        the pouch is configured to fit between a rim and a tire.

6. The apparatus of claim 5, wherein the pouch comprises an opening comprising at least one of a slit, a bung, or a plastic zipper.

7. The apparatus of claim 5, wherein the volume is about 1 fluid ounce to about 4 fluid ounces, and the pouch comprises a sheet of material bonded to itself to form a chamber.

8. An apparatus, comprising:
    a pouch including a sealant and a breaching area; and
    a valve stem fluidly coupled to the pouch;
    wherein, when pressurized air is applied through the valve stem and into the pouch, the pouch is configured to breach at the breaching area and cause at least a majority of the sealant to leave the pouch.

9. The apparatus of claim 8, wherein the pouch comprises a sheet of material bonded to itself to form a chamber.

10. The apparatus of claim 8, wherein the material is at least one of polyethylene, polypropylene, polystyrene, polyvinyl chloride, polytetrafluoroethylene, or nylon.

11. The apparatus of claim 8, wherein the pouch is configured to breach at a predetermined pressure of the pressurized air.

12. The apparatus of claim 8, wherein the predetermined pressure is about 5 pounds per square inch to about 60 pounds per square inch.

13. The apparatus of claim 8, wherein the valve stem further comprises a valve.

14. The apparatus of claim 13, wherein the valve comprises at least one of a Schrader valve, a Presta valve, or a tire pressure monitoring system (TPMS) valve.

15. The apparatus of claim 8, wherein the sealant comprises at least one of latex or glycol.

16. The apparatus of claim 8, wherein the valve stem further comprises a valve stem support configured to seat the valve stem in a rim.

17. The apparatus of claim 8, wherein the pouch comprises a plurality of chambers.

18. The apparatus of claim 8, wherein the valve stem is a tire valve stem and the pouch is configured to fit between a rim and a tire.

19. The apparatus of claim 18, wherein the pouch has a diameter of about 0.5 inches to about 3 inches, the pouch has a length of about 3 inches to about 9 inches, and the tire is a bicycle tire.

* * * * *